United States Patent

[11] 3,630,752

[72] Inventor Herbert F. Scott, Jr.
 Prince George, Va.
[21] Appl. No. 861,144
[22] Filed Sept. 25, 1969
[45] Patented Dec. 28, 1971
[73] Assignee Allied Chemical Corporation
 New York, N.Y.

[54] NITRATE ADDITION TO INHIBIT CORROSIVE ACTION OF AMMONIATED SUPERPHOSPHORIC ACID
 13 Claims, No Drawings

[52] U.S. Cl. ................................................ 99/2,
 71/32, 252/387, 252/147, 21/2.7
[51] Int. Cl. ........................................................ A23k 1/00,
 C23f 11/00, C05b 7/00
[50] Field of Search .......................................... 99/2, 14;
 252/387, 397, 146, 147; 71/32; 21/2, 7

[56] References Cited
 UNITED STATES PATENTS
2,582,129  1/1952  Jacoby ........................ 252/387

| 2,994,664 | 8/1961 | Wachter | 252/146 |
| 3,024,099 | 3/1962 | Martinson | 252/387 |
| 3,160,495 | 12/1964 | Smith et al. | 71/32 |
| 3,180,735 | 4/1965 | Titus | 99/2 |
| 3,512,986 | 5/1970 | Snyder et al. | 99/2 |

FOREIGN PATENTS

| 586,320 | 12/1959 | Canada | 252/387 |

Primary Examiner—Norman Yudkoff
Assistant Examiner—Hiram H. Bernstein
Attorneys—Patrick L. Henry and Fred L. Kelly ABSTRACT: Ferrous and aluminum metal corrosion by an aqueous solution of ammoniated superphosphoric acid is inhibited by incorporating about 0.5–5 percent by weight of nitrate ion based on the total phosphorous content measured as $P_2O_5$. The aqueous solution, which is useful as a ruminant feed supplement, has a pH of 5–8, a nitrogen content of 9–12 percent by weight, and a total phosphorous content measured as $P_2O_5$ of 28–39 percent by weight.

3,630,752

NITRATE ADDITION TO INHIBIT CORROSIVE ACTION OF AMMONIATED SUPERPHOSPHORIC ACID

BACKGROUND OF THE INVENTION

This invention relates to aqueous ammoniated superphosphoric acid solutions; in particular, it relates to the inhibition of the corrosive action thereof on ferrous and aluminum metals.

Various ammonium phosphate compounds have had use for some time as ruminant feed supplements. Ruminants, including cattle and sheep, are of great economic importance over much of the world; however, in many places the natural forage available to such animals is deficient in various elements, such as nitrogen, phosphorus, iron, calcium and magnesium, which are important for the ruminant's growth and health. There has been a continuing interest in supplementing the diet of ruminants to overcome such deficiencies. It is preferable for the supplement to be in a liquid form, such as an aqueous solution, so that it has the inherent advantageous properties of a liquid including ease of measuring, transferring and mixing. Low cost is another important factor.

Phosphoric acid obtained by the wet process is relatively inexpensive and contains water-soluble trace minerals of value to the ruminant. Unfortunately, these trace minerals flocculate when the wet-process acid is ammoniated so that it is not practical to prepare a liquid ruminant feed supplement directly from wet-process phosphoric acid.

It has been suggested that aqueous ammoniated superphosphoric acid derived from wet-process phosphoric acid be used as a ruminant feed supplement. This material contains polyphosphates which solubilize the trace minerals present in the wet-process acid. The ammoniated superphosphoric acid is readily prepared by evaporating wet-process phosphoric acid at high temperatures to form superphosphoric acid containing pyrophosphoric acid, which is then diluted with water and ammoniated.

Unfortunately, it has been found that aqueous ammoniated superphosphoric acid is corrosive to aluminum and ferrous metals. Therefore, the marketing and use of the solutions has presented the problem of preventing undue corrosion of the ferrous and aluminum equipment already in use for handling other liquid ruminant feed supplement materials.

The problem of corrosive action on equipment in which ammoniated superphosphoric acid solutions are handled has been met by incorporating certain corrosion inhibitors. Ammonium fluoride and ammonium chromate are good inhibitors, but the use of these compounds is restricted by their toxicity to ruminants. Ideally, a corrosion inhibitor should substantially reduce corrosion; it should be nontoxic at levels much greater than the levels required to substantially reduce corrosion; it should be in soluble form for easy mixing with the feed solution; and it should be capable of being easily shipped and stored prior to its use. Inhibitors used heretofore did not have these and other requirements which are satisfied by the inhibitors of this invention.

SUMMARY OF THE INVENTION

An object of this invention is to provide an aqueous ammoniated superphosphoric acid solution containing a corrosion inhibitor for protection of aluminum and ferrous metals with which the solution is contacted.

Another object of the present invention is to provide a nitrogen and phosphorus-containing ruminant feed supplement at about neutral pH in liquid form which is highly stable during storage.

A further objective is to provide a feed supplement that is palatable to ruminants, assists the symbiotic microflora normally present in the digestive tract of ruminants, and increased the ruminants feed efficiency.

It has now been found that these and other objects are obtained by incorporating in an aqueous ammoniated superphosphoric acid about 0.5 to 5 percent by weight nitrate ion based on the total phosphorus content measured as $P_2O_5$, said aqueous ammoniated superphosphoric acid being only partially ammoniated to a pH of from about 5 to 8.

The aqueous ammoniated superphosphoric acid is normally obtained by evaporating wet-process phosphoric acid to form superphosphoric acid, which is then diluted with water and ammoniated to pH 5–8. The nitrate ion is incorporated in the form of a nitrate compound such as ammonium nitrate, sodium nitrate or potassium nitrate, soluble in the aqueous ammoniated superphosphoric acid.

DESCRIPTION OF THE INVENTION

The aqueous ammoniated superphosphoric acid of this invention has a pH of from about 5 to 8, preferably about 6; a nitrogen content of from about 9 to 12 percent by weight, preferably from about 10 to 11 percent by weight; a total phosphorus content measured as $P_2O_5$ of from about 28 to 39 percent by weight, preferably about 34 to 38 percent by weight, and wherein polymeric phosphates represent from about 30 to 70 percent by weight, preferably from about 55 to 65 percent by weight, based on the weight of the total phosphorus content. The solution preferably contains about 1–5 percent trace minerals derived from wet-process phosphoric acid. The polymeric phosphates include pyrophosphates and other polyphosphates.

An aqueous ammoniated superphosphoric acid derived from wet-process phosphoric acid and having the following properties which will hereinafter be referred to as "Solution A," has been found to be useful for purposes of the present invention:

| | |
|---|---|
| Nitrogen | 10% by weight |
| Phosphorus[1] (as $P_2O_5$) | 34% by weight |
| Trace minerals | 1 to 2% by weight |
| iron ($Fe_2O_3$) | ca. 1.0% by weight |
| calcium (CaO) | ca. 0.1% by weight |
| magnesium (MgO) | ca. 0.3% by weight |
| pH | 6.0 |
| Specific Gravity at 60° F. | 1.4 |
| Salting out temperature | 0° F. |

Distribution as % by weight of the ammonium phosphates present was about:

37% ammonium orthophosphate
49% ammonium pyrophosphate
8% ammonium tripolyphosphate
5% ammonium tetrapolyphosphate
1% higher ammonium phosphates Solution A is stable for many weeks with or without added nitrate inhibitor. Small amounts of water-soluble nutritive trace minerals such as iron, copper, and zinc may be added to Solution A and retained in solution.

With respect to the nitrate compounds that may be utilized as inhibitor in this invention, the most commonly available are ammonium nitrate, sodium nitrate and potassium nitrate. From an economic standpoint, the presence of ammonium nitrate in the ruminant feed supplement increases its feed value. Accordingly, ammonium nitrate is the preferred inhibitor material employed in carrying out this invention. A mixture of urea and ammonium nitrate has also been used as inhibitor with desirable results. It appears that urea provides a synergistic effect with respect to corrosion inhibition.

The nitrate compound is added to the aqueous ammoniated superphosphoric acid solution in an amount to provide an effective corrosion-inhibiting level of nitrate ion in the solution. Normally, a nitrate ion level of at least about 0.5 percent by weight based on the $P_2O_5$ level will be used although lower nitrate levels may be employed if less effective inhibition is acceptable. Nitrate ion levels as high as 5 percent and even higher are effective, although levels in excess of about 5 percent will usually not be used for economic reasons. Levels between about 1 and 4 percent are preferred.

It has been found that the pH of the aqueous partially ammoniated superphosphoric acid is critical. That is, a pH lower than 5 results in greatly increased rates of corrosion of both aluminum and ferrous metals even in the presence of nitrate inhibitor, and a pH of about 6 is preferred. On the other hand, a pH greater than 8 results in increased corrosion rates of ferrous metals. Moreover, a pH greater than 8 adversely affects the stability of the solutions in that trace minerals tend to precipitate.

Surprisingly, the nitrate compound in the aqueous ammoniated superphosphoric acid solutions serves to protect against corrosion both ferrous and aluminum metals which are attacked by these solutions. Metals commonly used in equipment for handling liquid ruminant feed solutions which are protected against corrosion by this invention include the mild and carbon steels, substantially pure aluminum (over 99 percent) and aluminum containing up to about 5 percent of alloying elements, principally silicon, manganese, magnesium, or chromium, or combinations of these, and the aluminum alloys with a copper content not above about 0.25 percent.

The following examples are illustrative of the invention. In these examples the amounts of materials given in percentages are by weight. The aqueous ammoniated superphosphoric acid solution used is Solution A described hereinabove.

Four aqueous ammoniated superphosphoric acid test solutions are prepared based on Solution A. Inhibitors ammonium are ammonium nitrate, and a solution consisting of 45.1 percent ammonium nitrate, 34.8 percent urea and 20.1 percent water. For convenience the latter inhibitor is called $NH_4NO_3$-Urea Solution.

| Solution Number | Inhibitor | Total Inhibitor % | $(NO_3)^-$, Weight % of $P_2O_5$ |
|---|---|---|---|
| 1 | None | None | — |
| 2 | $NH_4NO_3$ | 1 | 2.3 |
| 3 | $NH_4NO_3$-Urea Solution | 2 | 2.1 |
| 4 | $NH_4NO_3$-Urea Solution | 1 | 1.0 |

EXAMPLE I

Specimens of carbon steel, ASTM A-285 Grade B, are ground to a 240-grit finish, measured, cleaned with brush and scouring powder, rinsed with water, rinsed with acetone, dried, weighed and then supported on glass hangers and contacted with the test solutions in a straight vertical section of a glass circulation loop. The circulation loop is completely filled with the test solution and circulation is maintained by means of a stainless steel pump. Contact is for 5–7 days at a flow of 6 feet per second at about 36° C. The procedure is repeated in duplicate for Solutions 1, 2 and 3. At the end of the contact time, the specimens are cleaned with a fiber brush and scouring powder, rinsed with water, rinsed with acetone, dried and weighed. Average corrosion rates in mils per year are then calculated. Table I shows the relative corrosiveness of these ruminant feed supplement solutions to carbon steel.

TABLE I.—CARBON STEEL

| Solution number | Inhibitor, wt. percent | Contact time, days | Initial pH | Penetration, m.p.y. | $(NO_3)^-$, wt. percent of $P_2O_5$ |
|---|---|---|---|---|---|
| 1 | None | 5 | 6 | 22.4 | None |
|   | do | 5 | 6 | 21.0 | None |
| 2 | $NH_4NO_3$, 1.0 | 7 | 6 | 11.4 | 2.3 |
|   | $NH_4NO_3$, 1.0 | 7 | 6 | 12.7 | 2.3 |
| 3 | $NH_4NO_3$-urea solution, 2.0 | 7 | 6 | 4.9 | 2.1 |
|   | do | 7 | 6 | 4.7 | 2.1 |

EXAMPLE II

Example II is carried out in the same manner as example I except that aluminum AA 5454–H34 is tested against Solutions 1, 2, 3, and 4. This alloy contains about 0.40 Si + Fe, 0.10 Cu, 0.5–1.0 Mn, 2.4–3.0 Mg, 0.05–0.20 Cr, 0.25 Zn, 0.20 Ti, 0.15 others, remainder aluminum. Table II shows the relative corrosiveness of these ruminant feed supplement solutions on the aluminum specimens.

TABLE II.—ALUMINUM

| Solution number | Inhibitor, wt. percent | Contact time, days | Initial pH | Penetration, m.p.y. | $(NO_3)^-$, wt. percent of $P_2O_5$ |
|---|---|---|---|---|---|
| 1 | None | 5 | 6 | 66.5 | None |
|   | do | 5 | 6 | 67.4 | None |
| 2 | $NH_4NO_3$, 1.0 | 7 | 6 | 25.0 | 2.3 |
|   | $NH_4NO_3$, 1.0 | 7 | 6 | 22.9 | 2.3 |
| 3 | $NH_4NO_3$-urea solution, 2.0 | 7 | 6 | 28.1 | 2.1 |
|   | do | 7 | 6 | 28.7 | 2.1 |
| 4 | $NH_4NO_3$-urea solution, 1.0 | 5 | 6 | 25.7 | 1.0 |
|   | do | 5 | 6 | 26.8 | 1.0 |

EXAMPLE III

A feeding test is carried out with 84 heifers weighing about 800 pounds each. The test lasts 56 days and the animals are allowed to eat ad libitum. The feed ration is supplemented with Solution A containing 1% $NH_4NO_3$ as corrosion inhibitor. This is equivalent to about 2.3 percent nitrate ion based on the $P_2O_5$ content of Solution A. The feed ration is shown in table III. The heifers gain an average of about 3.3 pounds per day over the 56-day test.

TABLE III

Average Daily Feed
(Pounds for 84 Heifers Fed Ration Containing Solution A Inhibited with 1 Wt. % $NH_4NO_3$)

| | | |
|---|---|---|
| Ground Alfalfa | 153 | |
| Ground Ear Corn | 480 | |
| Ground Shelled Corn | 474 | |
| Milo (Barley) | 450 | |
| Dehydrated Alfalfa Pellets | 50 | |
| Flax Meal | 109 | |
| Hi Pro Pellets | 98 | |
| Wet Pulp | 355 | |
| Silage | 282 | |
| Dicalcium phosphate | 10 | (First 14 days) |
| Solution A containing 1% $NH_4NO_3$ | 8.3 | (Last 42 days) |
| Calcium Carbonate | 4 | (Last 42 days) |
| Green Chop | 1,367 | |
| Salt | 13.4 | |

I claim:

1. The process for controlling corrosiveness to ferrous and aluminum metals of a solution of ammoniated superphosphoric acid in water, said solution having a pH from about 5 to 8, a nitrogen content of from about 9 to 12 percent by weight, a total phosphorus content measured as $P_2O_5$ of from about 28 to 39 percent by weight, and wherein polymeric phosphates represent from about 30 to 70 percent by weight based on the total phosphorus content, which process comprises incorporating in said solution about 0.5 to 5 percent by weight, based on the total phosphorus content measured as $P_2O_5$, of nitrate ion in the form of a nitrate compound soluble in the said ammoniated superphosphoric acid solution.

2. The process as claimed in claim 1 wherein the ammoniated superphosphoric acid solution is derived from wet-process phosphoric acid and contains at least about 1 to 5 percent trace minerals derived from the wet-process phosphoric acid.

3. The process as claimed in claim 2 wherein the solution of ammoniated superphosphoric acid in water has a pH of about 6, a nitrogen content of from about 10 to 11 percent by weight, a total phosphorus content measured as $P_2O_5$ of from about 34 to 38 percent by weight, and wherein the polymeric phosphates represent about 55 to 65 percent by weight based on the total phosphorus content.

4. The process as claimed in claim 2 wherein the nitrate compound is selected from the group consisting of ammonium nitrate, sodium nitrate and potassium nitrate.

5. The process as claimed in claim 2 wherein the nitrate compound is ammonium nitrate, and about 1 to 4 percent by weight nitrate ion is incorporated based on the total phosphorus content measured as $P_2O_5$.

6. The process as claimed in claim 2 wherein the nitrate compound is ammonium nitrate and at least about 75 percent by weight urea is incorporated in the ammoniated superphosphoric acid solution based on the weight of ammonium nitrate.

7. As a new composition of matter of low corrosiveness toward ferrous and aluminum metals a solution of ammoniated superphosphoric acid in water having a pH from about 5 to 8 and containing from about 9 to 12 percent by weight nitrogen, from about 28 to 39 percent by weight total phosphorus content measured as $P_2O_5$, and wherein polymeric phosphates represent from about 30 to 70 percent by weight based on the total phosphorus content, about 0.5 to 5 percent by weight, based on the total phosphorus content measured as $P_2O_5$, of nitrate ion in the form of a nitrate compound soluble in the said ammoniated superphosphoric acid solution, and the balance substantially consisting of water.

8. The composition as claimed in claim 7 wherein the ammoniated superphosphoric acid solution is derived from wet-process phosphoric acid and contains at least about 1 to 5 percent trace minerals derived from the wet-process phosphoric acid.

9. The composition as claimed in claim 8 wherein the solution of ammoniated superphosphoric acid in water has a pH of about 6, a nitrogen content of from about 10 to 11 percent by weight, a total phosphorus content measured as $P_2O_5$ of from about 34 to 38 percent by weight, and wherein the polymeric phosphates represent about 55 to 65 percent by weight based on the total phosphorus content.

10. The composition as claimed in claim 8 wherein the nitrate compound is selected from the group consisting of ammonium nitrate, sodium nitrate and potassium nitrate.

11. The composition as claimed in claim 8 wherein the nitrate compound is ammonium nitrate, and about 1 to 4 percent by weight nitrate ion is incorporated based on the total phosphorus content measured as $P_2O_5$.

12. The composition as claimed in claim 8 wherein the nitrate compound is ammonium nitrate and at least about 75 percent by weight urea is incorporated in the ammoniated superphosphoric acid solution based on the weight of ammonium nitrate.

13. A process for controlling corrosiveness to ferrous and aluminum metals of a solution of ammoniated superphosphoric acid in water, said solution having a pH from about 5 to 8, a nitrogen content of from about 9 to 12 percent by weight, a total phosphorus content measured as $P_2O_5$ of from about 28 to 39 percent by weight, and wherein polymeric phosphates represent from about 30 to 70 percent by weight based on the total phosphorus content, which process comprises incorporating in said solution about 1.0 to 2.3 percent by weight, based on the total phosphorus content measured as $P_2O_5$, of nitrate ion in the form of a nitrate compound soluble in the said ammoniated superphosphoric acid solution.

* * * * *